United States Patent
Gleeson et al.

(10) Patent No.: US 9,567,742 B2
(45) Date of Patent: Feb. 14, 2017

(54) ACOUSTIC DAMPING BUILDING MATERIAL

(71) Applicant: James Hardie Technology Limited, Dublin (IE)

(72) Inventors: James Gleeson, Rosehill (AU); Karl Laing, Rosehill (AU); Milton O'Chee, Rosehill (AU); Peter Pagones, Rosehill (AU)

(73) Assignee: James Hardie Technology Limited, Dublin (IE)

( * ) Notice: Subject to any disclaimer, the term of this patent is extended or adjusted under 35 U.S.C. 154(b) by 0 days.

(21) Appl. No.: 14/888,932

(22) PCT Filed: May 13, 2014

(86) PCT No.: PCT/EP2014/059791
§ 371 (c)(1),
(2) Date: Nov. 3, 2015

(87) PCT Pub. No.: WO2014/184205
PCT Pub. Date: Nov. 20, 2014

(65) Prior Publication Data
US 2016/0083960 A1  Mar. 24, 2016

(30) Foreign Application Priority Data

May 13, 2013 (GB) .................................. 1308520.4
Dec. 20, 2013 (GB) .................................. 1322669.1

(51) Int. Cl.
*E04B 2/30* (2006.01)
*E04B 1/82* (2006.01)
(Continued)

(52) U.S. Cl.
CPC . *E04B 1/82* (2013.01); *B32B 5/16* (2013.01); *B32B 13/047* (2013.01);
(Continued)

(58) Field of Classification Search
CPC ............... E04B 1/82; E04B 1/86; E04B 2/56; E04B 1/8409; E04B 2001/8476; E04B 2001/742; B32B 13/047; B32B 5/16; B32B 2307/102; B32B 2264/02; B32B 2419/00; G10K 11/16; E04F 13/075; E04F 19/00
USPC ........................... 52/483.1, 506.01; 181/286
See application file for complete search history.

(56) References Cited

U.S. PATENT DOCUMENTS 3,070,474 A * 12/1962 Smith ..................... C03C 17/02
156/99
4,702,046 A * 10/1987 Haugen ..................... E04B 1/10
181/286
(Continued)

FOREIGN PATENT DOCUMENTS

EP        0812968 A2    12/1997
WO   WO 2014/184205 A1  11/2014

OTHER PUBLICATIONS

International Search Report and Written Opinion mailed Jul. 30, 2014 in International Application No. PCT/EP2014/059791.

*Primary Examiner* — Basil Katcheves
(74) *Attorney, Agent, or Firm* — Knobbe Martens Olson & Bear, LLP (57) ABSTRACT

An acoustic damping building material (100) comprising an acoustic damping layer (118) secured to at least a portion of a substrate (110). The acoustic damping layer comprises at least two media wherein the at least two media are configured such that the acoustic damping layer comprises at least one direct energy transmission pathway and at least one indirect energy transmission pathway through the acoustic damping layer to the substrate.

19 Claims, 7 Drawing Sheets

(51) Int. Cl.
*G10K 11/168* (2006.01)
*B32B 5/16* (2006.01)
*B32B 13/04* (2006.01)
*E04B 1/86* (2006.01)
*E04B 2/56* (2006.01)
*E04F 13/075* (2006.01)
*E04F 19/00* (2006.01)
*G10K 11/16* (2006.01)
*E04B 1/84* (2006.01)
*E04B 1/74* (2006.01)

(52) U.S. Cl.
CPC ............. *E04B 1/8409* (2013.01); *E04B 1/86* (2013.01); *E04B 2/56* (2013.01); *E04F 13/075* (2013.01); *E04F 19/00* (2013.01); *G10K 11/16* (2013.01); *G10K 11/168* (2013.01); *B32B 2264/02* (2013.01); *B32B 2307/102* (2013.01); *B32B 2419/00* (2013.01); *B32B 2471/00* (2013.01); *B32B 2607/00* (2013.01); *E04B 2001/742* (2013.01); *E04B 2001/8281* (2013.01); *E04B 2001/8461* (2013.01); *E04B 2001/8476* (2013.01)

(56) References Cited

U.S. PATENT DOCUMENTS

| | | | | |
|---|---|---|---|---|
| 4,989,688 | A * | 2/1991 | Nelson | E04B 1/8227 181/286 |
| 5,601,919 | A * | 2/1997 | Symons | B32B 13/14 428/116 |
| 6,562,444 | B1 * | 5/2003 | Gleeson | B32B 13/00 428/214 |
| 7,566,475 | B2 * | 7/2009 | Connelly | B32B 5/16 427/195 |
| 8,579,079 | B2 * | 11/2013 | Beauvilain | B60R 13/08 181/290 |
| 2005/0194210 | A1 * | 9/2005 | Panossian | B32B 3/12 181/293 |
| 2006/0037815 | A1 * | 2/2006 | Schabel, Jr. | B60R 13/08 181/290 |
| 2010/0282632 | A1 * | 11/2010 | Schabel, Jr. | E04B 1/7604 206/524.1 |
| 2014/0044955 | A1 * | 2/2014 | Schabel, Jr. | E04B 1/88 428/323 |

* cited by examiner

ACOUSTIC DAMPING BUILDING MATERIAL

The present invention relates to a building material and in particular a building material that is suitable for damping acoustic resonance or sound transmissions.

It is recognised that acoustic resonance or sound transmissions within and between buildings is of great concern for building inhabitants, particularly as the density of habitation increases and as aesthetic tastes for hard surface finishes proliferates.

One approach to reducing noise transmission through walls and floors of buildings is to use denser materials, which inherently limits sound transmission by acting as a barrier material which reflects sound waves or energy. However, use of denser materials does not address impact acoustic, noise or sound transmissions, whereby the noise or sound waves are formed in the denser material on impact.

A further approach to reducing noise transmissions is found in multiple storey or multiple layer construction. In such systems, combined floor-ceiling installations are placed between storeys or floors. The combined floor-ceiling installations comprise multiple layers including for example, a central structural flooring sheet, to which varying combinations of drywall, gypsum board or plasterboard, insulation batts, insulation boards, insulation mats, concrete slabs, aesthetic floor surfaces which are arranged in various combinations to provide a reduction in transmitted sound intensity between the storeys or layers. The problem associated with such systems is the amount of space such installations occupy in the building structure. Ultimately, the height of the building and or the number of storeys often needs to be adjusted to allow for such installations.

A further example of a noise reducing technique incorporates the use of roll out insulating mats, which are placed between a pre-existing building substrate and an aesthetic surface layer. Often such insulating mats are installed over existing concrete or timber structural floors. These mats may be compressed at the point(s) where a building sheet is fixed to a subframe through the mat. It is necessary to install a building sheet, for example, an MDF layer and/or battens over the acoustic mat(s) in order to fix a decorative hard surface to the floor. It is understood, that use of such measures does not effectively reduce transmission of sound energy within the construction.

It is an object of the present invention to overcome or ameliorate at least one disadvantage of the prior art or to provide a useful alternative.

According to the invention, there is provided an acoustic damping building material comprising:

a substrate and an acoustic damping layer, the acoustic damping layer being secured to at least a portion of the substrate, the acoustic damping layer comprising at least two media wherein the at least two media are configured such that the acoustic damping layer comprises at least one direct energy transmission pathway and at least one indirect energy transmission pathway through the acoustic damping layer to the substrate.

The advantage of the acoustic building material of the invention is that a single product provides multiple combinations of structure borne energy transmission pathways through which sound energy can be absorbed and/or transmitted. The acoustic building material of the invention comprises at least two differing media or materials comprising different properties which in turn generate multiple combinations of structure borne energy transmission pathways through which sound energy can be absorbed and/or transmitted. In use, the acoustic damping layer provides methods by which sound fluctuations can be absorbed and/or dissipated whilst the substrate layer provides a barrier material which reflects sound fluctuations back into the acoustic damping layer. The reflected sound fluctuations are then also absorbed and dissipated. In this way, acoustic noise can be limited via impact and acoustic or vibrational transfer of sound energy through the building structure.

It is acknowledged that the term 'comprise' may, under varying jurisdictions be provided with either an exclusive or inclusive meaning. For the purpose of this specification, the term comprise shall have an inclusive meaning that it should be taken to mean an inclusion of not only the listed components it directly references, but also other non-specified components. Accordingly, the term 'comprise' is to be attributed with as broad an interpretation as possible within any given jurisdiction and this rationale should also be used when the terms 'comprised' and/or 'comprising' are used.

It is to be understood that throughout the specification, the term direct energy transmission pathway is used to describe a transmission pathway through the acoustic damping layer that enables energy to proceed through the media following a relatively straight course i.e. a pathway that is without interruption. In contrast the term indirect energy transmission pathway is used to describe a transmission pathway through the acoustic damping layer that does not follow such a course, i.e. may include one or more interruptions.

In a further embodiment of the invention, the at least two media are interspersed amongst each other to form the direct and indirect energy transmission pathways.

In one embodiment of the invention the acoustic damping layer comprises at least two media wherein one of the at least two media comprises a different transmission coefficient ($\tau$) to the other of the at least two media.

In a further embodiment of the invention, one of the at least two media comprises at least one polymeric material.

In a further embodiment of the invention one of the at least two media comprises one or more polymeric materials. Conveniently, the one or more polymeric materials each comprise a transmission coefficient ($\tau$). Optionally, in one embodiment of the invention, the transmission coefficients ($\tau$) of the one or more polymeric materials are the same for each of the polymeric materials. In an alternative embodiment of the invention, the transmission coefficients ($\tau$) of the one or more polymeric materials are different for each of the one or more polymeric materials. In a further embodiment of the invention, wherein one of the at least two media comprises a combination of at least three polymeric materials, the transmission coefficients ($\tau$) of the polymeric materials are optionally the same or different relative to each other.

In one embodiment of the invention, the at least one polymeric material comprises a polymeric particulate material. In a further embodiment of the invention, the at least one polymeric particulate material comprises a plurality of particles dispersed within the acoustic damping layer. In a further embodiment of the invention the polymeric material is a granular material whereby the granular material comprises small and independent granules. Optionally the particles and/or granules have different shapes, for example, either regular or irregular shapes. In one embodiment of the invention the particles or granules are formed by crumbing or shredding a piece of the polymeric material. Conveniently in a further embodiment of the invention, the polymeric particles or granules comprise a mixture of crumbed or shredded particles or granules.

In a further embodiment of the invention, the polymeric material is selected from the one or more of the group comprising natural rubbers, nitrile rubbers, butyl rubbers, silicone rubbers, Ethylene Propylene Diene Monomer rubber (EPDM), synthetic rubbers, polyacrylates, polyurethanes, vinyl polymers, copolymers.

In a further embodiment of the invention, the particles or granules of one of the at least two media and the other of the two media are dispersed amongst each other within the acoustic damping layer such that a portion of the particles or granules of one of the at least two media are contiguous to an adjacent particle or granule of the same media so as to form a direct energy transmission pathway through the acoustic damping layer and a portion of the particles or granules of the polymeric material of one of the at least two media are contiguous to an adjacent particle of the other of the at least two media so as to form an indirect energy transmission pathway through the acoustic damping layer. Optionally, wherein one of the at least two media comprises further polymeric materials, a portion of the particles or granules of the polymeric material of one of the at least two media are contiguous to either an adjacent particle of a particle or granule of a further polymeric material or the other of the at least two media so as to form an indirect energy transmission pathway through the acoustic damping layer.

In a further embodiment of the invention, the other of the at least two media comprises a void volume, wherein the void volume is understood to be a volume of unoccupied area or space dispersed within the acoustic damping layer. In a further embodiment of the invention the void volume is occupied by a fluid. In one embodiment of the invention, the fluid is a single gas or a mixture of gases.

Conveniently, the one or more polymeric materials and the void volume are interspersed amongst each other, whereby the particles of one of the at least two media and the void volume or the other of the at least two media are dispersed amongst each other within the acoustic damping layer such that a portion of the particles of one of the at least two media are contiguous to an adjacent particle of the same media so as to form a direct energy transmission pathway through one of the at least two media of the acoustic damping layer and a portion of the particles of one of the at least two media are contiguous to an adjacent void volume so as to form an indirect energy transmission pathway through one of the at least two media of the acoustic damping layer.

In one embodiment of the invention, the acoustic damping layer is provided as a continuous material wherein the at least two media are interwoven together to form the continuous material. Conveniently in one embodiment of the invention, the acoustic damping layer comprises a continuous material in the form of a mat which is used to cover the portion or all of the substrate material.

Optionally, in one embodiment of the invention, the acoustic damping layer comprising polymeric particulate material is configured to have an outwardly appearing continuous line. In this way, the indirect and direct energy transmission pathways within the acoustic damping layer are not readily visible to the end user.

In a further embodiment of the invention, the polymeric particulate material is arranged such that the acoustic damping layer comprising polymeric particulate material is in the form of a mat which is used to cover a portion or all of the substrate material.

In a further embodiment of the invention, the acoustic damping layer further comprises a polymeric binder, wherein the polymeric binder is selected from the group comprising emulsion polymers, polymer solutions, polymer dispersions, thermosetting polymers, and thermoplastic polymers. In a further embodiment of the invention the polymeric binder comprises a mixture of a polymeric resin, water and one or more additives wherein the one or more additives are selected from the group comprising flow control agents, rheology modifiers, fire retardants, preservatives, fungicides, insecticides, pigments, colorants, water repelling agents and any other suitable additive known to a person skilled in the art. The polymeric binder can have a different or the same transmission coefficient ($\tau$) as compared to one or both of the at least two media. Conveniently the polymeric binder is combined with one or more of the at least two media to bind the one or more of the at least two media together such that the at least two media are interspersed amongst each and the polymeric binder forms a non-continuous phase intermediate the interspersed at least two media thereby forming the direct and indirect energy transmission pathways.

In a further embodiment of the invention, wherein one of the at least two media comprises at least two polymeric materials, optionally the at least two polymeric materials each comprise a polymeric particulate material. In one embodiment of the invention, the at least two polymeric particle materials and the void volume are dispersed amongst each other within the acoustic damping layer such that a portion of the particles of one of the at least two polymeric particle materials are contiguous to an adjacent particle of the same polymeric particle material so as to form a direct energy transmission pathway through one of the at least two polymeric particle material of the acoustic damping layer and a portion of the particles of one of the at least two polymeric particle materials are contiguous to an adjacent particle of the other of the at least two polymeric particle materials or a void volume so as to form an indirect energy transmission pathway through one of the at least two media of the acoustic damping layer.

In a further embodiment of the invention, one of the at least two media comprises between approximately 5% and 80%±2% by volume of the acoustic damping layer. In a further embodiment of the invention, one of the at least two media comprises between approximately 10% and 70%±2% by volume of the acoustic damping layer. In a further embodiment of the invention, one of the at least two media comprises between approximately 15% and 70%±2% by volume of the acoustic damping layer. In the preferred embodiment of the invention, each of the polymeric material and void volume comprise between approximately 5% and 80%±2% by volume, preferably between approximately 10% and 70%±2% by volume and more preferably between approximately 15% and 70%±2% by volume of the acoustic damping layer. In a further embodiment of the invention the polymeric binder comprises between approximately 10% to 50%±2% by volume of the acoustic damping layer. It is to be understood that the volume of the polymeric material, void volume and optionally the polymeric binder when taken together cannot exceed 100% by volume of the acoustic damping layer. Thus it follows in the instance where the polymeric material comprises in excess of 50% by volume of the acoustic damping layer that the void volume comprises less than 50% by volume of the acoustic damping layer such that the total volume of the polymeric material and void volume does not exceed 100% by volume of the acoustic damping layer and vice versa.

In one embodiment of the invention the acoustic damping layer comprises a mixture of crumbed and shredded polymeric material, a void volume and a polymeric binder wherein the crumbed and shredded polymeric material comprise approximately 60%±2% by weight of the acoustic damping layer and the polymeric binder comprises approximately 40%±2% by weight of the acoustic damping layer. In this embodiment of the invention, the ratio of crumbed polymeric material to shredded polymeric material is 1:1. Conveniently, the porosity of the acoustic damping layer of the invention is strictly controlled to ensure that the acoustic damping properties of the acoustic damping layer of the invention are enhanced.

In one embodiment of the invention, the substrate comprises a first face, a second face and an intermediate portion positioned between the first and second faces and an edge portion surrounding the intermediate portion such that the first and second faces, intermediate portion and edge member together form a panel or sheet of predetermined thickness. In this embodiment of the invention, the first and second faces are opposing faces of the panel or sheet. In a further embodiment of the invention the intermediate portion and edge portion are integrally formed with the first and second faces of the substrate.

In one embodiment of the invention, the substrate is a load bearing structural substrate, wherein the structural substrate is able to withstand static loading. It is be to understood that the static loading requirements are defined within each territory by the appropriate local or regulatory building codes. In one embodiment of the invention the load bearing structural substrate is a structural flooring sheet, panel or board. In one embodiment of the invention the load bearing structural substrate has a minimum loading level of 5 KPa.

In a further embodiment of the invention the acoustic damping layer is secured to at least a portion of the first face of the substrate. Conveniently, the acoustic damping layer is secured by any appropriate means such that the acoustic damping layer is firmly attached to the substrate. When this embodiment of the invention is in use in a building structure, the acoustic damping building material can be arranged such that the acoustic damping layer is positioned between the substrate and the source of the sound energy or alternatively such that the acoustic damping layer is remote from the source of the sound energy, i.e. the substrate is located between the acoustic damping layer and the source of the sound energy. Advantageously, when the acoustic damping layer is positioned between the substrate and the source of sound energy, the direct and indirect energy transmission pathways of the acoustic damping layer operate to absorb and/or dissipate a significant amount of sound energy before the sound energy reaches the substrate layer.

In a further embodiment of the invention the acoustic damping layer is secured to at least a portion of the first face and at least a portion of the second face of the substrate. Conveniently separate acoustic damping layers can be provided for the first and second face of the substrate respectively. The advantage of this embodiment of the invention is that any noise or sound energy which is transmitted through a first acoustic damping layer and the substrate is absorbed by the second acoustic damping layer on the opposite face.

In one embodiment of the invention, the distance from one surface of the acoustic damping layer to an opposing surface is between approximately 1 mm and approximately 20 mm thick. In a further embodiment of the invention, the distance between one surface of the acoustic damping layer to the opposing surface is between approximately 2 mm and approximately 10 mm. The advantage of this is that the acoustic damping layer is a thin layer which when combined with the substrate layer of the invention achieves acoustic damping/noise reduction without occupying a large spatial area.

According to one embodiment of the invention, the substrate comprises a density within the range of 900 to 1800±100 Kg/m$^3$. The advantage of using a denser material is that is reduces airborne acoustic, noise or sound transmissions.

According to one embodiment of the invention, the substrate comprises a cementitious bound material. In a further embodiment of the invention, the cementitious bound material comprises a fibre cement panel or sheet, for example, a fibre cement flooring sheet or a fibre cement building panel.

The advantage of using a cementitious bound material as a substrate is that it provides a durable and workable material which has greater density than most wooden substrates normally used in construction. The cementitious bound material substrate together with acoustic damping layer of the invention provide an acoustic damping building material that reduces both airborne and impact acoustic, noise or sound transmissions.

In a further embodiment of the invention, the distance between the first and second face of the substrate panel or sheet is between approximately 15 mm and approximately 50 mm. Optionally in one embodiment of the invention, the distance between one surface of the acoustic damping building layer and the opposing surface wherein the acoustic damping building layer comprises the substrate panel and the acoustic layer is between approximately 19 mm and 27 mm. Thus in one embodiment of the invention, the distance between one surface of the acoustic damping building material and an opposing surface can achieve distances of 16 mm to 70 mm as compared to an equivalent distance of more than 200 mm in prior art systems.

In a further embodiment of the invention the edge portion of the substrate further comprises a protruding or projecting member which extends beyond the edge of the first and/or second face of the substrate. In a further embodiment of the invention the edge portion further comprises a receiving portion which is sized and shaped such that it is adapted to receive a complimentary shaped protruding or projecting member extending beyond the edge of the first and/or second face of the substrate. Conveniently, in a further embodiment of the invention the edge portion of a substrate layer is provided with both a protruding or projecting member and a receiving portion. In such an arrangement the protruding or projecting member and receiving portion are arranged on the edge portion such that the protruding or projecting member of a first substrate layer can seat within a receiving portion of an adjacent substrate layer when two or more substrate layers are nested together. In a further embodiment of the invention, the protruding or projecting member of the substrate and/or the receiving portion are configured to facilitate provision of a cavity intermediate the protruding or projecting member and the receiving portion, such that a securing material, for example, a sealant or adhesive can be placed in the cavity. The securing material acts to secure two or more substrate layers together in a nested arrangement. Advantageously, the securing material can also act as an acoustic damping material.

In a further embodiment of the invention, the acoustic damping building material comprises an outer layer, wherein the outer layer is provided on the outermost surface of the acoustic damping building material which is normally visible to the end user.

Conveniently, the outer layer provides a smoother and more durable surface for the end user, for example, an aesthetic coating such as a skimmed coating of a cementitious material or a flooring surface. It is to be understood that any suitable outer layer known to a person skilled in the art which will achieve the function of the outer layer can also be used. Conveniently, it is possible to fix the outer layer, for example, a tile finishing layer, directly to the acoustic damping layer. In a further embodiment of the invention, the outer layer comprises an optimising layer and a finishing layer, wherein the optimising layer is used to improve surface flatness and/or provide additional structural support for the finishing layer. An example of such an embodiment of the invention is the use of a screed as the optimising layer to improve surface flatness and provide additional structural support for a tile finishing layer. It is to be understood that the acoustic properties of the acoustic damping building material are maintained when using an outer layer. Conveniently, in a further embodiment of the invention, the acoustic damping building material is suitable for use as a structural floor surface for an underfloor heating system wherein the pipes for the underfloor heating are provided between the joists of the flooring structure.

According to the invention, there is further provided an acoustic damping building system comprising:
  a building subframe structure,
  at least one section of acoustic damping building material according to the invention comprising: a substrate and an acoustic damping layer, the acoustic damping layer being secured to at least a portion of the substrate, the acoustic damping layer comprising at least two media wherein the at least two media are configured such that the acoustic damping layer comprises at least one direct energy transmission pathway and at least one indirect energy transmission pathway through the acoustic damping layer to the substrate, the or each section of acoustic damping building sheet being securable to the building subframe structure, and an aesthetic surface layer securable to the or each acoustic damping building sheet, for providing an aesthetic building finish.

The advantage of the acoustic damping building system of the invention is that the acoustic energy generated directly or indirectly within the aesthetic surface layer is damped by the or each acoustic damping building material section, which leads to abatement of acoustic noise transmission to adjacent room spaces through the building subframe structure.

In one embodiment of the invention, the acoustic damping building material is securable to the building subframe by mechanical means, wherein the mechanical means is selected from one or more of the group comprising nails, screws, scrails, staples, bolts, and masonry anchors. Optionally, in one embodiment of the invention, the acoustic damping building material is securable to the building subframe by a concealed fixing system. In a further embodiment of the invention, the acoustic damping building material is securable to the building subframe by chemical means, for example, by means of an adhesive. In a further embodiment of the invention, the acoustic damping material is securable to the building subframe using a combination of mechanical and chemical means.

According to the invention, there is provided a method of constructing an acoustic damping building system comprising the steps of:
  (a) providing a building subframe structure;
  (b) providing at least one section of acoustic damping building material according to the invention, the acoustic damping building material comprising: a substrate and an acoustic damping layer, the acoustic damping layer being secured to at least a portion of the substrate; the acoustic damping layer comprising at least two media wherein the at least two media are configured such that the acoustic damping layer comprises at least one direct energy transmission pathway and at least one indirect energy transmission pathway through the acoustic damping layer to the substrate;
  (c) Installing a section of the acoustic damping building material by positioning the acoustic damping building material into a user selectable position on the building subframe and securing it to the building subframe; and
  (d) applying and securing a surface layer to the acoustic damping layer on the acoustic damping building material to provide an aesthetic finish.

In one embodiment of the invention, the method of constructing an acoustic damping building system further comprises after step (c) the further steps of:
  (c1) Securing a subsequent section of the acoustic damping building material onto the building subframe relative to the previously installed section of acoustic damping building material, and securing it to the building subframe,
  (c2) Repeating step (c1) until the desired building section is covered.

In one embodiment of the invention, the acoustic damping building material is securable to the building subframe by mechanical means, wherein the mechanical means is selected from one or more of the group comprising nails, screws, scrails, staples, bolts, and masonry anchors. Optionally, in one embodiment of the invention, the acoustic damping building material is securable to the building subframe by a concealed fixing system. In a further embodiment of the invention, the acoustic damping building material is securable to the building subframe by chemical means, for example, by means of an adhesive. In a further embodiment of the invention, the acoustic damping material is securable to the building subframe using a combination of mechanical and chemical means.

In a further embodiment of the invention, the acoustic damping building material is suitable for use in combination with other acoustic damping building materials. In particular the acoustic damping building material of the invention is suitable for use with an acoustic dampener comprising: a base member, wherein the base member comprises a first surface and a second surface, the first and second surface being spaced apart from each other defining a thickness there between; at least two side arms, wherein each side arm comprises a first end and a second end, each side arm extending from the first surface of the base member at a pre-determined angle, such that there is a channel formed whereby each side arm and the base member form the sides and the base of the channel formation respectively; and a pair of flanges, each flange extending substantially orthogonally from the second end of each side arm and wherein the predetermined angle is elastically deformable. In this embodiment of the invention the channel formation is configured to receive a batten and the or each flange is configured to retain a batten within the channel.

According to a further embodiment of the invention there is also provided a floor structure comprising acoustic damping building material and an acoustic dampener securable to a structural substrate, a batten disposed within the channel formation and flooring material secured to the batten.

Other advantages of the invention are that the acoustic damping building material provides a lightweight alternative to other acoustic damping systems, which do not require application of multiple layers or skills from different trades. Use of a single layer of material, and the associated reduction in spacing between floors or walls means a reduction in building and materials costs which is hugely advantageous for the end user.

The invention will now be described more particularly with reference to the accompanying drawings, which show by way of example only three embodiments of the acoustic damping building material of the invention.

In the drawings,

FIG. 3b is an enlarged cross-sectional side view of section A of the acoustic building damping material of FIG. 3a;

FIG. 3c is a further enlarged cross-sectional side view of section B of the acoustic building damping material of FIG. 3a;

Referring now to the drawings and specifically to FIG. 1A to 1e, there is shown a first embodiment of an acoustic building damping material 100 comprising a substrate 110 and an acoustic damping layer 118 secured to the substrate 110. In the embodiment shown the substrate 110 is a load bearing structural substrate in the form of a flooring sheet which is approximately 499 mm in width and 2400 mm in length. Flooring sheet 100 can support minimum static loads of 5 KPa. In this embodiment of the invention, the substrate 100 comprises a cementitious bound material, for example a fibre cement material with a density within the range of 900 to 1800±100 Kg/m$^3$.

Substrate 110 comprises a first face 112, a second face 114 and an intermediate portion 116 positioned between the first and second faces and an edge member 116a, 116b surrounding the intermediate portion. In the embodiment shown the first and second faces, intermediate portion and edge member together integrally form a panel or sheet of predetermined thickness. The edge member or portion 116 of substrate layer 110 is provided with both a protruding or projecting member 116a and a receiving portion 116b, thereby comprising a tongue and groove configuration. In this embodiment of the invention the distance from the uppermost surface of the acoustic building damping material 100 to the opposing lowermost surface of the acoustic building damping material 100 is approximately 27 mm, wherein the distance from the uppermost surface of the acoustic damping layer 118 to the opposing lowermost surface of the acoustic damping layer 118 is approximately 5.0 mm and the distance from the uppermost surface of the substrate layer 110 to the opposing lowermost surface of the substrate layer 110 is approximately 22.0 mm. The edge member 116 of the substrate layer is further provided with a chamfered or bevelled edge 116c (shown clearly in FIG. 1b) at the first face 112 of the substrate layer 110. This provides a user with a slightly opened area for a sealant to be applied easily between two adjacent sheets of the acoustic damping building material 100 of the invention. The chamfered or bevelled edge 116c enables a better seal to form between the adjacent sheets.

Figure 1A:
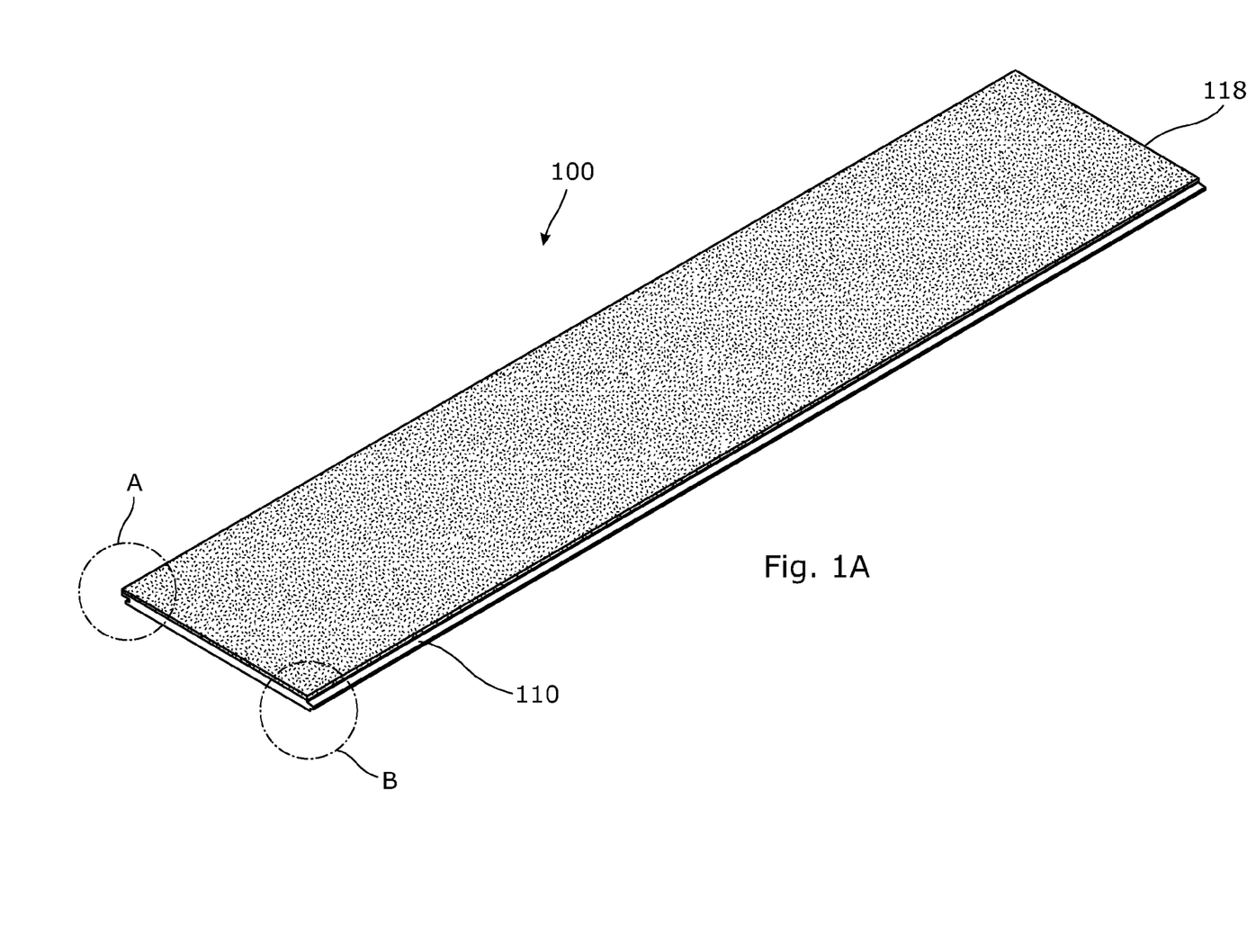
FIG. 1A is a perspective view of an acoustic flooring system according to the invention.
Figure 1B:
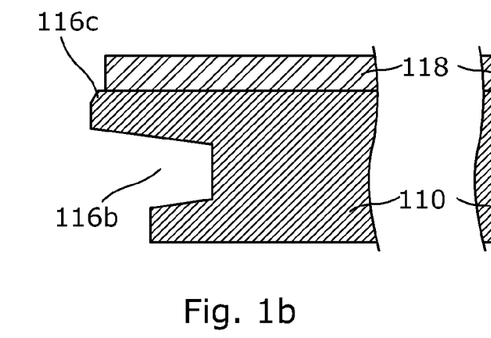
FIG. 1b is an enlarged partial end view of a first corner A of the acoustic flooring system of FIG. 1A.
Figure 1C:
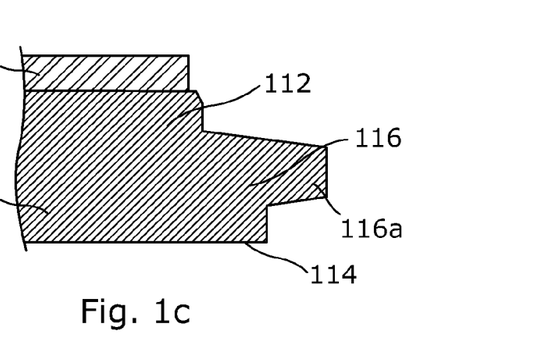
FIG. 1c is an enlarged partial end view of a second corner B of the acoustic flooring system of FIG. 1A.
Figure 1D:
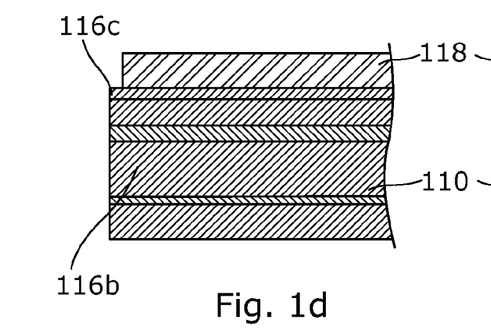
FIG. 1d is an enlarged partial side view of one side of the acoustic flooring system of FIG. 1A.
Figure 1E:
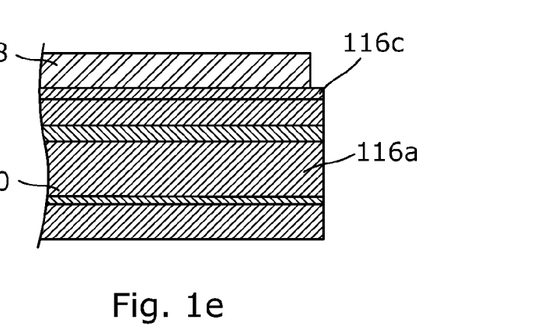
FIG. 1e is an enlarged partial side view of a second side of the acoustic flooring system of FIG. 1A.

In the embodiment of the invention shown in FIGS. 1A to 1e, the acoustic damping layer 118 is secured by gluing to the first face of the substrate layer 110 such that the acoustic damping layer 118 covers predominantly all of the first face of the substrate layer 110. Acoustic damping layer 118 does not extend to cover all of the first face 112 of the substrate layer 110, this is to allow for compression of the acoustic damping layer when a load is placed on the acoustic building damping material 100 of the invention. In the embodiment shown the uncovered area between the edge of the acoustic damping layer 118 and the edge portion 116 is approximately 2.25 mm across the width of the board as shown in FIGS. 1b and 1c and approximately 2.0 mm across the length of the board as shown in FIGS. 1d and 1e.

Conveniently when this embodiment of the invention is in use in a building structure, the acoustic damping layer 118 can be arranged such that the acoustic damping layer 118 is positioned between the substrate 100 and the source of the sound energy or alternatively such that the acoustic damping layer 118 is remote from the source of the sound energy, i.e. the substrate 100 is located between the acoustic damping layer 118 and the source of the sound energy.

Figure 2:
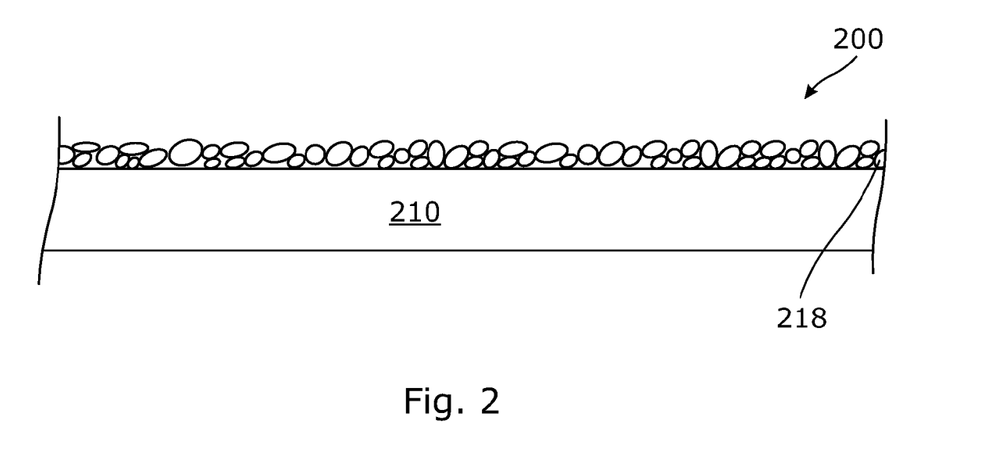
FIG. 2 is a cross-sectional side view of a portion of an acoustic damping building material according to a second embodiment of the present invention.
Figure 3A:
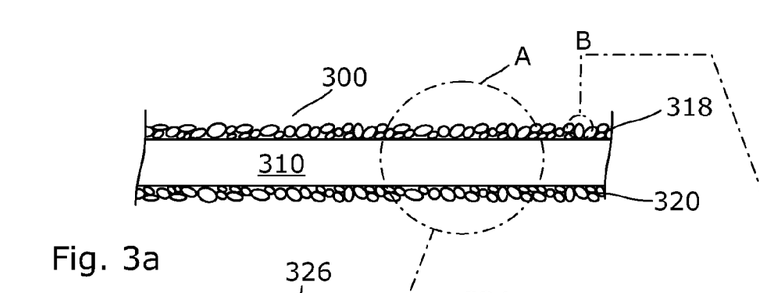
FIG. 3a is a cross-sectional side view of a portion of an acoustic building damping material according to a third embodiment of the present invention.

Referring now to FIG. 2 and FIGS. 3a to 3c. FIG. 2 shows a second embodiment of a portion of the acoustic damping building material 200 of the invention comprising a substrate 210 and an acoustic damping layer 218 secured thereto. FIG. 3a shows a third embodiment of a portion of the acoustic damping building material 300 of the invention comprising a substrate 310 and a first and second acoustic damping layer 318 and 320 respectively. In the second and third embodiment shown, acoustic damping layers 218, 318 and 320 cover all of substrate 210, 310 respectively. It will be appreciated that it is possible for the damping layers to cover all or at least a portion of the substrate 210, 310 respectively.

In the embodiments shown, the acoustic damping layers 118, 218, 318 and 320 comprise two media wherein the media are configured such that each of the acoustic damping layers 118, 218, 318, 320 comprise at least one direct energy transmission pathway and at least one indirect energy transmission pathway through the acoustic damping layer 118, 218, 318, 320 to the substrate 210 and 310 respectively. Although the acoustic damping layer 118, 218, 318 320 are not drawn to scale, it is to be understood that in one embodiment of the invention, the acoustic damping layer 118, 218, 318, 320 has a depth of between approximately 1 mm and 20 mm from an exterior surface to an interior surface whereby the exterior surface is defined as the surface of the acoustic damping layer remote from the substrate 210 and 310 and the interior surface of the acoustic damping layer is adjacent the substrate 210 and 310 in any given configuration. In alternative embodiments of the invention the depth of the acoustic damping layer 118, 218, 318, 320 is any distance between approximately 2 mm and 10 mm.

Figure 3B:
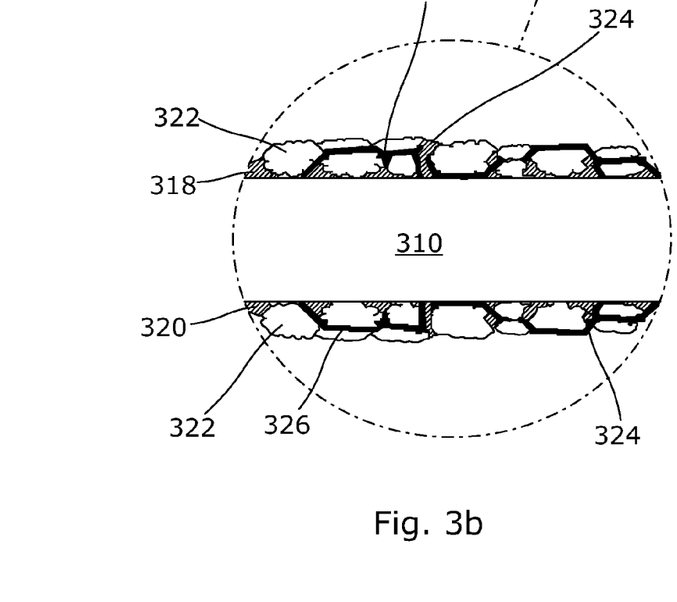
Figure 3C:
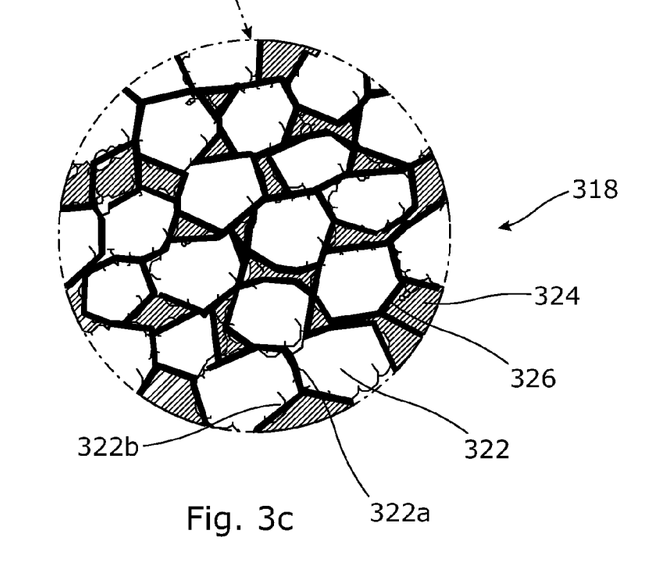

Referring specifically to FIGS. 3b and 3c, there are shown enlarged cross sectional views of the media of the acoustic damping layers 318 and 320. In the embodiment shown acoustic damping layers 318 and 320 are substantially the same. Each of the respective media 322 and 324 used in the acoustic damping layer 318 have a different transmission coefficient (τ) to the other and are interspersed in the acoustic damping layer 318 to form the direct and indirect energy transmission pathways. It is to be understood that the media of the acoustic damping layers can be any suitable media or material known to a person skilled in the art. In the embodiment shown, the acoustic damping layer 318 comprises a polymeric material 322 which is in the form of a plurality of particles which have been dispersed and held in place by a polymeric binder 326.

The polymer particles 322 are of irregular shape, consequently interstitial void volumes 324 are present between adjacent polymer particles 322. The polymer particles 322 are dispersed amongst each other within the acoustic damping layer 318 such that in some instances, a portion of the surface area 322a of the particles 322 are contiguous to a portion of the surface area of an adjacent particle 322 of the same media. This forms a direct energy transmission pathway through the polymer media of the acoustic damping layer. Similarly, in some instances a portion of the surface area 322b of the polymer particles 322 are adjacent to a void volume 324 so as to form an indirect energy transmission pathway through the acoustic damping layer.

In the embodiments of the invention shown, the polymeric material 322 is selected from the group comprising natural rubbers, nitrile rubbers, butyl rubbers, silicone rubbers, EPDM, synthetic rubbers, polyacrylates, polyurethanes, vinyl polymers, copolymers. The polymeric binder 326 is selected from the group comprising emulsion polymers, polymer solutions, polymer dispersions, thermosetting polymers, and thermoplastic polymers. The void volume 324 is normally occupied by a mixture of gases, for example air. In all of the above any other materials known to a person skilled in the art which would achieve the object of the invention can also be used.

The void volume 324 is in effect dispersed throughout the acoustic damping layer 318 due to the arrangement of the irregularly shaped particulate polymeric material 322. Although not specifically shown in the drawings, in one embodiment of the invention, the void volume 324 occupies between 5 and 80% by volume of the acoustic damping layer. In further embodiments of the invention the void volume occupies between 10 and 50% by volume and between 15 and 35% by volume of the acoustic damping layer respectively.

Figure 4:
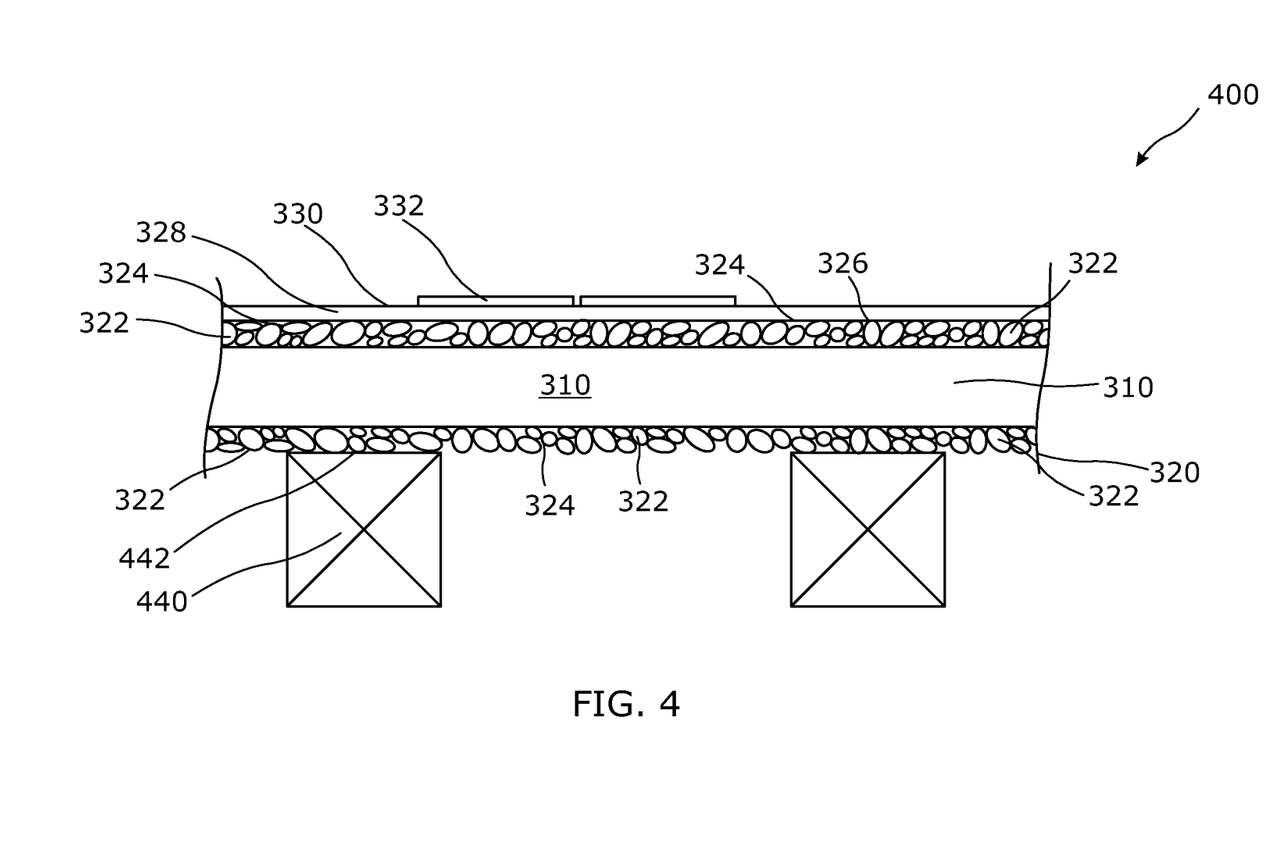
FIG. 4 is a cross-sectional side view of a portion of an acoustic flooring sheet according to one embodiment of the present invention.

Referring to FIG. 4, there is shown the acoustic damping building material 300 of FIG. 3a comprising two acoustic damping layers 318 and 320 in use as a flooring material 400. The building material is secured to support 440 such that the acoustic damping layer 320 abuts the support 440 along the support surface 442. Although not shown, it is to be understood that optionally in this embodiment of the invention, acoustic damping layer 320 adjacent support 440 has a greater depth than the acoustic damping layer 318 on the opposite side of the substrate 310. In one embodiment of the invention, acoustic damping layer 318 has a depth that is approximately 2 mm whilst acoustic damping layer 320 has a depth that is approximately 5 mm. The advantage of this embodiment of the invention is that the acoustic damping layer 318 on the trafficable side of the flooring material is designed to reduce impact noise, whilst the acoustic damping layer 320 is designed to absorb, dissipate and limit the transfer of impact and vibration to the support 440 and consequently throughout the building structure.

Figure 5A:
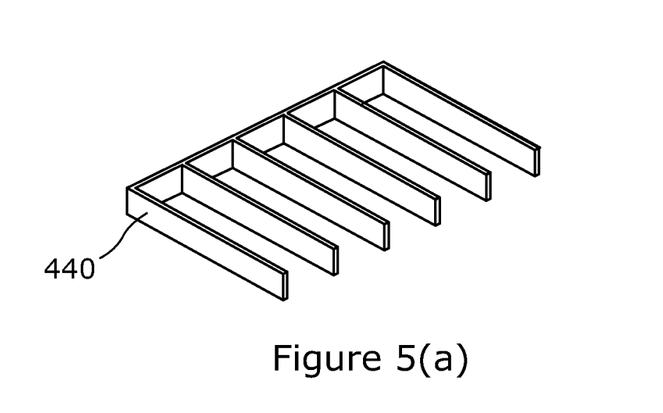
FIGS. 5(a) to 5(f) are a series of perspective views of the steps of installing an acoustic damping building system according to one embodiment of the present invention.
Figure 5B:
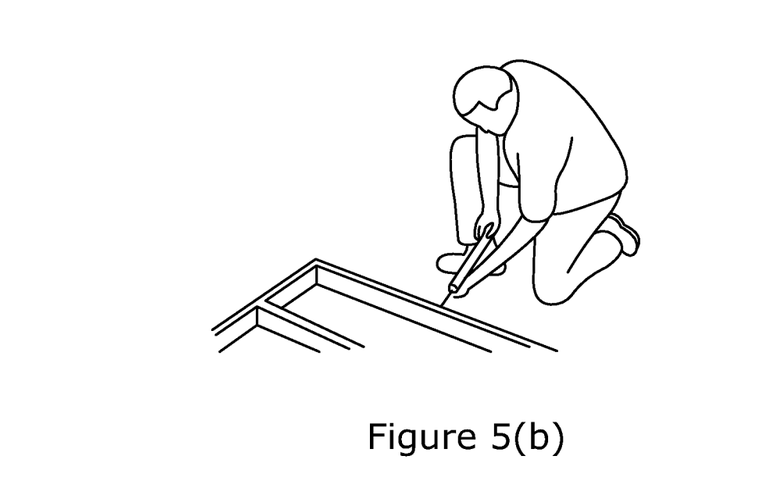
Figure 5C:
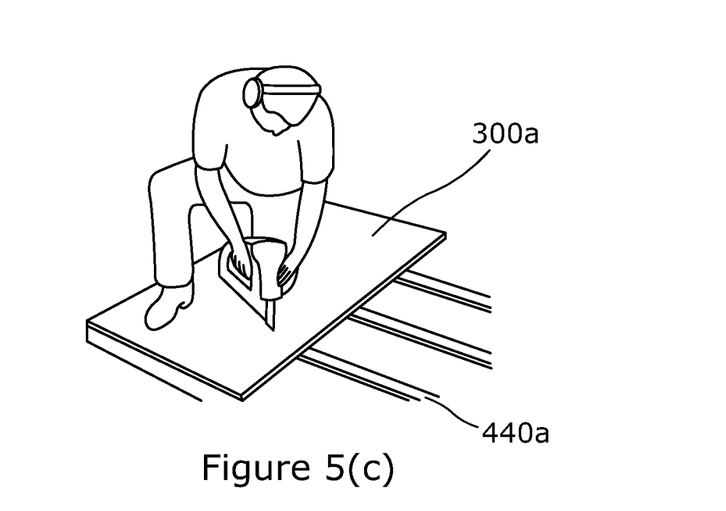
Figure 5D:
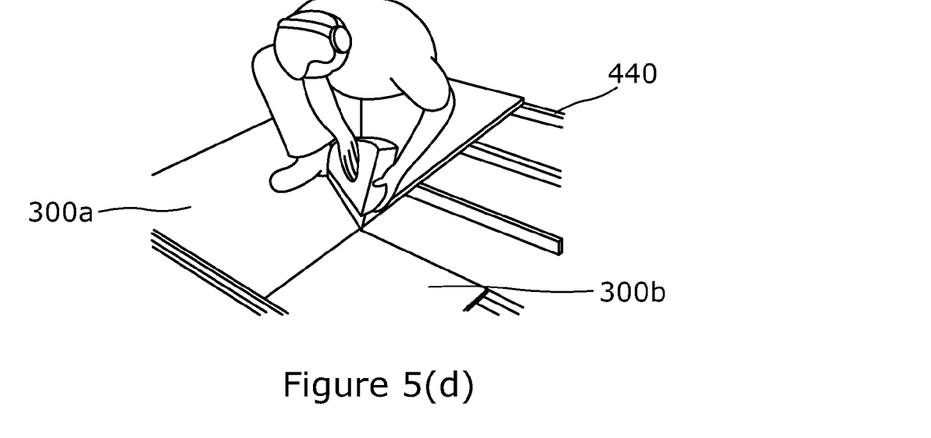
Figure 5E:
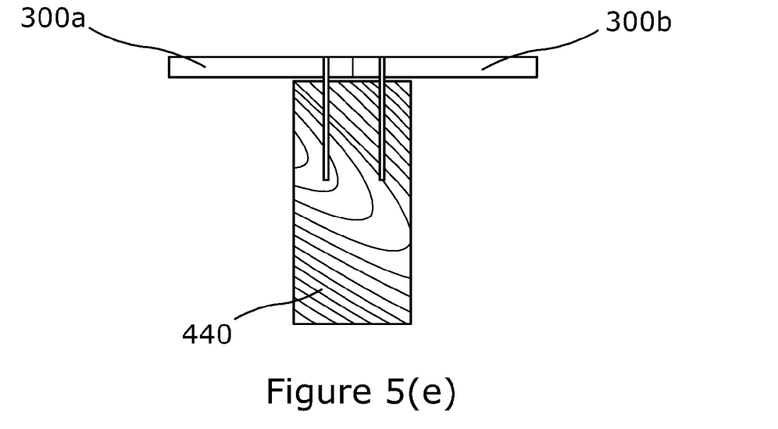
Figure 5F:
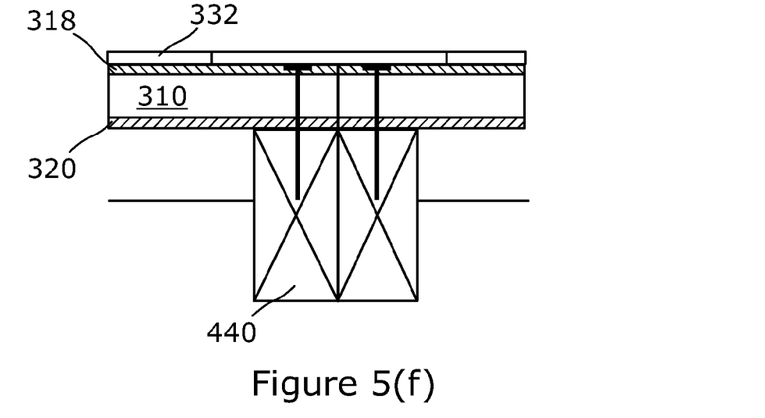

Referring now also to 5(a) to 5(f), there is shown an example of the steps of the method for installation flooring sheet 400 in a building structure. For the purposes of clarity, the acoustic damping building material 300 of FIG. 3a is shown without defining the acoustic damping layers in FIGS. 5(a) to 5(e). FIG. 5(a) is an example a building subframe structure 440. In FIGS. 5(b) to 5(d) the installer is shown reinforcing the building subframe structure 440 and securing a first and second section 300a and 300b respectively of the acoustic damping building material 300 of the invention to the building subframe structure 440 at predefined positions 440a on the subframe 440. FIG. 5(f) shows an aesthetic surface layer 332 secured to the acoustic damping building material 300 for providing an aesthetic building finish. It is to be understood that the acoustic damping building material is securable to the building subframe 440 by either mechanical or chemical means, wherein the mechanical means is selected from one or more of the group comprising nails, screws, scrails, staples, bolts, and masonry anchors; and the chemical means is by means of an appropriate adhesive.

The acoustic damping building material 100, 200 or 300 of the invention were tested to determine airborne and impact transmissions. In each instance the acoustic damping building material 100, 200 or 300 was tested having either a single acoustic damping layer attached to one side of the substrate or a double acoustic damping layer wherein a single acoustic damping layer was secured to opposing sides of a substrate. In all instances the acoustic damping building material was secured to a building sub frame. The acoustic building material was also tested with and without an outer decorative surface, wherein the decorative surface was either a timber laminate or a ceramic tile as set out below. The temperature of the testing area was also recorded.

Sound pressure levels are typically reported in decibel (dB) units. With 0 dB representing the threshold of audibility for a person of normal hearing capacity and 100 dB representing, say, the noise level in a subway railway station or heavy industrial machinery in operation. In a normal daily urban environment, a person may be exposed to sound levels such as average street noise at around 70 dB, an average office environment at around 60 dB, an average conversation at around 50 dB, and a quiet or private office at around 40 dB. The correlation between sound intensity and sound pressure is logarithmic and an increase of 10 dB in sound pressure level represents a 10-fold increase in sound intensity level, so the sound intensity at 100 dB is 10,000,000,000 times greater than that at 0dB. For a person of normal hearing, a change of 1-2 dB is not detectable. A change of 5 dB, however, is clearly detectable and a change of 10 dB is regarded as either a halving (if reduced by 10 dB) or doubling (if increased by 10 dB) of the noise level. A relatively small change in dB sound levels may, in fact, represent a significant change in the sound intensity in an environment.

Many sounds that people are exposed to in a modern environment span across a range of frequencies from about 50 Hz up to about 10 kHz. Voices are predominantly in the 100-300 Hz range. Heavy vehicles may be in the 50-1000 Hz range and car horns are in the AAA-5000 Hz range. All of the sounds in an environment may reach a person at different sound intensity depending on how far away they are from the source, any material between the person and the source of the sound that may act to absorb or transmit those sounds, and the sound travel pathways available.

Each material will have a characteristic sound absorption/transmission effectiveness depending not only its inherent material properties, but also its physical configuration such as shape, thickness and the like. Sound may also be transferred either directly through the material of a building section such as a wall or floor section &/or indirectly through airborne transmission.

Creating an environment for people, such as in residential dwellings or office/commercial spaces, requires that noise or sound intensity levels are managed. The ideal is to create an environment where sound intensity, through both direct and indirect transmission pathways, is below nuisance levels both for the person themselves and for any immediately adjacent neighbours.

In order for the acoustic damping building material of the invention to achieve adequate noise reduction, it is necessary for the airborne noise transmission to be greater than 45 dB.

The first embodiment 100 of the acoustic damping building material of the invention was tested in a combined structural floor, ceiling configuration, such a configuration is typically found between storeys of a multi-storey building construction. As set out below in Table One, the airborne noise transmission for the various embodiments of the invention is 60 and 62 Db ($R_w+C_{tr}$) respectively, whilst the impact noise transmission for the various embodiments of the invention is between 55 and 64 Db ($L_{n,Tw}$). The results of the test exemplify that the various embodiments of the invention operated to reduce both airborne and impact acoustic, noise or sound transmissions to an acceptable level.

TABLE ONE

TEST

| | Assembly Detail | Floor Covering | Structural Floor | Ceiling Configuration | Airbourne/ dB $R_w$ ($C_{tr}$) | Impact/ dB $L_{nT,w}$ | Temp/ ° C. |
|---|---|---|---|---|---|---|---|
| 100 | Single Acoustic Damping Layer and Fibre Cement Substrate 27 mm | | Joists with minimum spacing of 240 mm | Insulation: 100 mm with min value of 10 kg/m³; Resilient Bars: 16 mm × 0.45 mm metal resilient bar; 1st and 2nd ceiling layers: 15 mm | 62 (−9) | 57 | 15 |
| 100 | Fibre Cement Substrate and Single Acoustic Damping Layer 27 mm** | | | | 60 (−10) | 64 | 15 |
| 100 | Single Acoustic Damping Layer and Fibre Cement Substrate 27 mm | 6 mm Ceramic tile laid on flexible tile adhesive | | Gypsum board 912.5 Kg/m² | na | 55 | 15 |

**The single acoustic damping layer was on the lower side of the substrate layer adjacent the structural floor.

The second and third embodiments (assembly) 200 and 300 respectively of the acoustic damping building material of the invention were tested at various temperatures as a flooring material to determine the effectiveness of the building material. As set out below in Table Two, the airborne noise transmission for the various embodiments of the invention is 60 and 63 Db CO respectively, whilst the impact noise transmission for the various embodiments of the invention is between 52 and 59 Db ($L_{n,Tw}$). The results of the test exemplify that the various embodiments of the invention operated to reduce both airborne and impact acoustic, noise or sound transmissions to an acceptable level.

TABLE TWO

TEST

| Assembly | Detail | Floor Covering | Airborne/dB $R_w$ ($C_{tr}$) | Impact/dB $L_{nT, w}$ | Temp/° C. |
|---|---|---|---|---|---|
| 200 | Single Acoustic damping layer | None | 60 (−8) | 58 | 6 |
| 200 | Single Acoustic damping layer | Timber laminate | 62 (−9) | 55 | 6 |
| 200 | Single Acoustic damping layer | Ceramic Tile | Not Tested | 59 | 6 |
| 300 | Double Acoustic damping layer | None | 61 (−10) | 59 | 6-7 |
| 300 | Double Acoustic damping layer | Timber laminate | 63 (−8) | 52 | 6-7 |
| 300 | Double Acoustic damping layer | None (Room Heated) | Not Tested | 58 | 16-17 |
| 300 | Double Acoustic damping layer | Ceramic Tile | Not Tested | 57 | 11 |

Airborne pass - >45 dB
Impact Pass - <62 dB

The acoustic performance of all examples provided above meet or exceed the UK Building Code ADE AAA3 (Resistance to the Passage of Sound) provisions for an $L'_{nT,w}$ maximum value of 64 dB for floors, and stairs in buildings. (The lower the value the better). The $L'_{nT,w}$ value is the impact sound pressure level in a stated frequency band, corrected for reverberation time, according to BS EN ISO 140-7:1998.

The $R_w(C_{tr})$ standards for airborne noise transmission between rooms are also met or exceeded by all examples provided above. The $R_w$ ($C_{tr}$) is a measure of the is the weighted sound reduction index together with the traffic A-weighted spectrum added to take account of low frequency traffic noise in airborne transmissions.

It will of course be understood that the invention is not limited to the specific details described herein, which are given by way of example only, and that various modifications and alterations are possible within the scope of the invention as defined in the appended claims.

The invention claimed is:

1. An acoustic damping building material comprising;
a substrate and an acoustic damping layer, the acoustic damping layer being secured to a face of the substrate, at least a portion of the face being uncovered by the acoustic damping layer, the acoustic damping layer comprising at least two media, wherein a first media of the at least two media has a surface area defining a generally irregularly shaped particle, wherein the media are interspersed in a manner such that some of the irregularly shaped particles of the first media are in direct contact with adjacent irregularly shaped particles of the same media, and some other of the irregularly shaped particles of the first media are isolated from and do not contact other irregularly shaped particles of the same media, wherein the at least two media are configured such that the acoustic damping layer comprises at least one direct energy transmission pathway and at least one indirect energy transmission pathway through the acoustic damping layer to the substrate, the direct energy transmission pathway comprising two contiguous irregularly shaped particles of the first media, the indirect energy transmission pathway comprising an irregularly shaped particle of the first media and a second media, said second media having a different transmission coefficient to that of the first media.

2. An acoustic damping building material as claimed in claim 1, wherein one of the at least two media comprises at least one polymeric material.

3. An acoustic damping building material as claimed in claim 2, wherein the at least one polymeric material comprises a polymeric particulate material or a polymeric granular material.

4. An acoustic damping building material as claimed in claim 3, wherein one of the at least two media comprises one or more further polymeric materials, a portion of the particles or granules of the polymeric material of one of the at least two media are contiguous to either an adjacent particle of a particle or granule of one or more further polymeric materials or the other of the at least two media so as to form an indirect energy transmission pathway through the acoustic damping layer.

5. An acoustic damping building material as claimed in claim 2, wherein the polymeric material is selected from the group consisting of natural rubbers, nitrile rubbers, butyl rubbers, silicone rubbers, ethylene propylene diene monomer rubbers, synthetic rubbers, polyacrylates, polyurethanes, vinyl polymers, and copolymers.

6. An acoustic damping building material as claimed in claim 1, wherein the other of the at least two media comprises a void volume.

7. An acoustic damping building material as claimed in claim 6, wherein the void volume is occupied by a fluid.

8. An acoustic damping building material as claimed in claim 1, wherein the acoustic damping material further comprises a polymeric binder, selected from the group consisting of emulsion polymers, polymer solutions, polymer dispersions, thermosetting polymers, and thermoplastic polymers.

9. An acoustic damping building material as claimed in claim 1, wherein one of the at least two media comprises between 5% and 80%±2% of the acoustic damping layer.

10. An acoustic damping building material as claimed in claim 1, wherein one of the at least two media comprises between 10% and 50%±2% by volume of the acoustic damping layer.

11. An acoustic damping building material as claimed in claim 1, wherein one of the at least two media comprises between 15% and 35%±2% by volume by volume of the acoustic damping layer.

12. An acoustic damping building material as claimed in claim 1, wherein the substrate comprises a first face, a second face and an intermediate portion positioned between the first and second faces and an edge portion surrounding the intermediate portion such that the substrate, intermediate portion and edge member together form a panel or sheet of predetermined thickness.

13. An acoustic damping building material as claimed in claim 12, wherein the predetermined thickness of the substrate panel or sheet is between approximately 15 mm and approximately 50 mm.

14. An acoustic damping building material as claimed in claim 12, wherein the acoustic damping layer is secured to at least a portion of the first face of the substrate.

15. An acoustic damping building material as claimed in claim 12, wherein the acoustic damping layer is secured to at least a portion of the first face and at least a portion of the second face of the substrate.

16. An acoustic damping building material as claimed in claim 1, wherein the substrate comprises a material having a density between 900 and 1800 kg/m$^3$.

17. An acoustic damping building material as claimed in claim 1, wherein the substrate comprises a cementitious bound material.

18. An acoustic damping building material as claimed in claim 17, wherein the cementitious bound material comprises a fibre cement panel or a fibre cement sheet.

19. An acoustic damping building system comprising:
a building subframe structure,
at least one section of an acoustic damping building material according to claim 1, the at least one section of acoustic damping building material being securable to the building subframe structure, and
an aesthetic surface layer securable to the at least one acoustic damping building material, for providing an aesthetic building finish.

\* \* \* \* \*